US012732941B2

(12) United States Patent
Tao

(10) Patent No.: US 12,732,941 B2
(45) Date of Patent: Sep. 8, 2026

(54) INFORMATION TRANSMISSION METHOD AND APPARATUS, COMMUNICATION DEVICE, AND STORAGE MEDIUM

(71) Applicant: Beijing Xiaomi Mobile Software Co., Ltd., Beijing (CN)

(72) Inventor: Xuhua Tao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 258 days.

(21) Appl. No.: 18/291,477

(22) PCT Filed: Jul. 26, 2021

(86) PCT No.: PCT/CN2021/108453

§ 371 (c)(1),
(2) Date: Jan. 23, 2024

(87) PCT Pub. No.: WO2023/004543

PCT Pub. Date: Feb. 2, 2023

(65) Prior Publication Data

US 2024/0373389 A1 Nov. 7, 2024

(51) Int. Cl.
*H04W 64/00* (2009.01)

(52) U.S. Cl.
CPC .................................. *H04W 64/00* (2013.01)

(58) Field of Classification Search
CPC .............................. H04W 64/00; G01S 19/42
See application file for complete search history.

(56) References Cited

U.S. PATENT DOCUMENTS 11,134,464 B2 * 9/2021 Cui .......................... G01S 5/10
2007/0224990 A1 9/2007 Edge et al.
2019/0349881 A1 11/2019 Choi et al.
2020/0059888 A1 * 2/2020 Cui .......................... G01S 5/10
2020/0169831 A1 * 5/2020 Li .......................... G01S 19/43
2022/0217673 A1 * 7/2022 Zaidi ..................... H04W 64/00
2023/0156655 A1 * 5/2023 Manolakos ........... H04W 64/00 455/456.2
2026/0089489 A1 * 3/2026 Hu ......................... H04W 8/22

FOREIGN PATENT DOCUMENTS

CN 101232414 A 7/2008
CN 101946528 A 1/2011
CN 103154765 A 6/2013
CN 103200614 A 7/2013
CN 106604390 A 4/2017
CN 106171020 B 11/2019
CN 110972054 A 4/2020
CN 111937426 A 11/2020
WO 2018133752 A1 7/2018

* cited by examiner

*Primary Examiner* — Congvan Tran
(74) *Attorney, Agent, or Firm* — Volpe Koenig

(57) ABSTRACT

An information transmission method, including: in response to a positioning requirement triggered by a user equipment (UE), the UE sends positioning capability information to a positioning server, where the positioning capability information is configured to indicate positioning measurement capability of the UE.

13 Claims, 6 Drawing Sheets

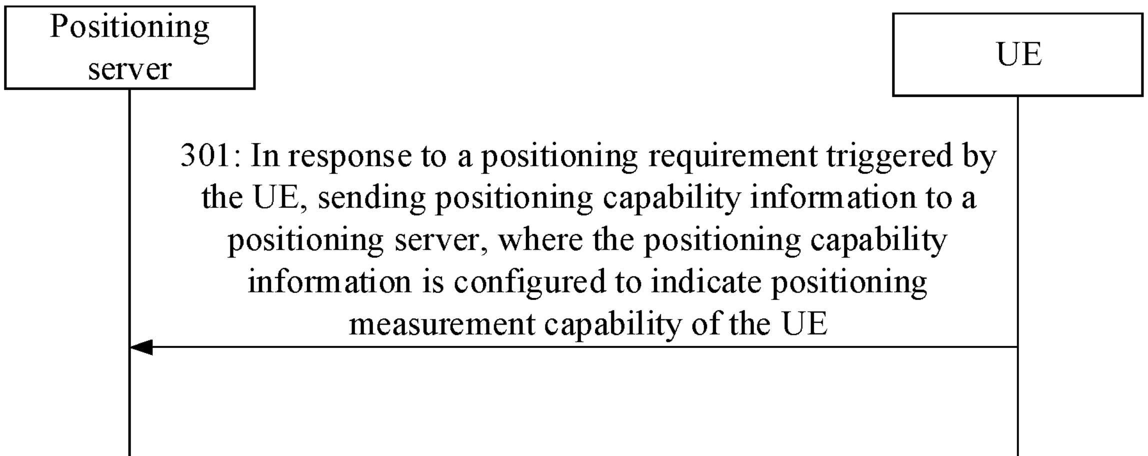

FIG. 3

Positioning server

UE

401: Receiving a first positioning request of the positioning server, where the first positioning request indicates the UE to perform first positioning measurement; and the first positioning request further includes first positioning assistance information, the first positioning assistance information being at least configured to indicate the UE to perform configuration of the first positioning measurement; and the first positioning request is determined by the positioning server based on the positioning capability information

Information transmission apparatus 100

First sending module 110

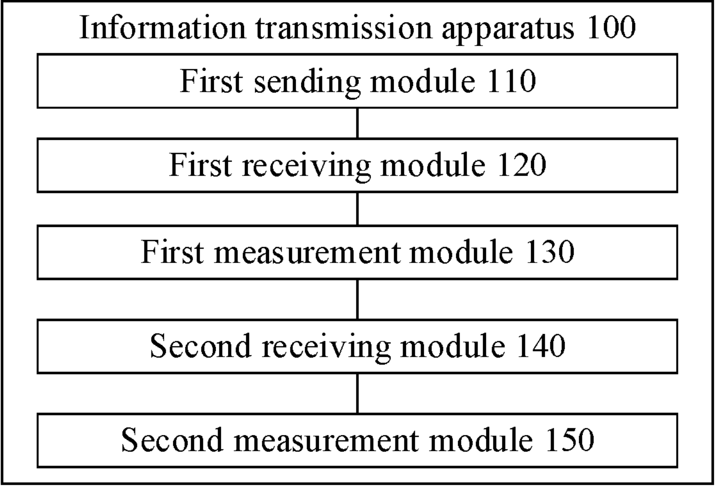
FIG. 9
Information transmission apparatus 200
Third receiving module 210
FIG. 10
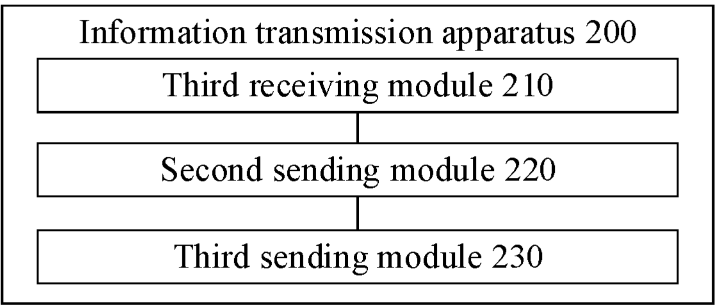
FIG. 11

INFORMATION TRANSMISSION METHOD AND APPARATUS, COMMUNICATION DEVICE, AND STORAGE MEDIUM

CROSS-REFERENCE TO RELATED APPLICATION

The present application is a U.S. National Stage of International Application No. PCT/CN2021/108453, filed on Jul. 26, 2021, the contents of all of which are incorporated herein by reference in their entirety for all purposes.

TECHNICAL FIELD

The present disclosure relates to, but is not limited to, the field of wireless communication technologies, and in particular to, an information transmission method and apparatus, a communication device, and a storage medium.

BACKGROUND

In a cellular mobile communication network, a user equipment (UE), such as a mobile phone terminal, may determine its position by measuring a wireless signal.

The UE may obtain a positioning measurement result by performing a positioning measurement on wireless signals sent by a plurality of base stations, and report the positioning measurement result to a location management function (LMF) entity on a network side, where the LMF entity determines a position of the UE according to the positioning measurement result and returns the determined position to the UE.

SUMMARY

According to a first aspect of examples of the present disclosure, there is provided an information transmission method, where the method is performed by a user equipment (UE), and the method includes: in response to a positioning requirement triggered by the UE, sending positioning capability information to a positioning server, where the positioning capability information is configured to indicate positioning measurement capability of the UE.

According to a second aspect of examples of the present disclosure, there is provided an information transmission method, where the method is performed by a positioning server, and the method includes: receiving positioning capability information sent by a user equipment (UE), where the positioning capability information is sent by the UE in response to a positioning requirement triggered by the UE, and the positioning capability information is configured to indicate positioning measurement capability of the UE.

According to a third aspect of examples of the present disclosure, there is provided an information transmission apparatus, where the apparatus includes: a first sending module, configured to send, in response to a positioning requirement triggered by a UE, positioning capability information to a positioning server, where the positioning capability information is configured to indicate positioning measurement capability of the UE.

According to a fourth aspect of examples of the present disclosure, there is provided an information transmission apparatus, where the apparatus includes: a third receiving module, configured to receive positioning capability information sent by a user equipment (UE), where the positioning capability information is sent by the UE in response to a positioning requirement triggered by the UE, and the positioning capability information is configured to indicate positioning measurement capability of the UE.

According to a fifth aspect of examples of the present disclosure, there is provided a communication device, including a processor, a memory, and an executable program stored on the memory and executable by the processor, where the executable program, when executed by the processor, causes the processor to implement the steps of the information transmission method according to the first aspect or the second aspect.

According to a sixth aspect of examples of the present disclosure, there is provided a non-transitory storage medium, storing an executable program which, when executed by a processor, causes the processor to implement steps of the information transmission method according to the first aspect or the second aspect.

BRIEF DESCRIPTION OF THE DRAWINGS

The accompanying drawings are incorporated in this specification and constitute a part of this specification, show examples conforming to the present disclosure, and are used together with this specification to explain the examples of the present disclosure.

FIG. 3 is a schematic flowchart of an information transmission method according to an example.

FIG. 4 is a schematic flowchart of another information transmission method according to an example.

FIG. 5 is a schematic flowchart of still another information transmission method according to an example.

FIG. 6 is a schematic flowchart of yet another information transmission method according to an example.

FIG. 9 is a block diagram of another information transmission apparatus according to an example.

FIG. 10 is a block diagram of still another information transmission apparatus according to an example.

FIG. 11 is a block diagram of yet another information transmission apparatus according to an example.

DETAILED DESCRIPTION

Examples are described in detail, and examples are presented in the accompanying drawings. In the case that the following description relates to the accompanying drawings, unless specified otherwise, same numbers in different accompanying drawings represent a same or similar element. Implementations described in the following examples do not represent all implementations consistent with the examples of the present disclosure. On the contrary, the implementations are examples of apparatuses and methods that are described in the appended claims in detail and that are consistent with some aspects of the examples of the present disclosure.

The terms used in examples of the present disclosure are for the purpose of illustrating specific examples, and are not intended to limit the examples of the present disclosure. The terms "a" and "the" of singular forms used in the examples and the appended claims of the present disclosure are also intended to include plural forms, unless otherwise specified in the context clearly. It can also be understood that the term "and/or" as used refers to and encompasses any and all possible combinations of one or more of the associated listed items.

It can be understood that although the terms first, second, third, and the like may be used in the examples of the present disclosure to describe various information. Such information will not be limited by these terms. These terms are used to distinguish the same type of information from each other. For example, first information may also be referred to as second information, and similarly, second information may also be referred to as first information, without departing from the scope of the examples of the present disclosure. Depending on the context, for example, the word "if" as used may be explained as "while" or "when" or "in response to determining".

Figure 1:
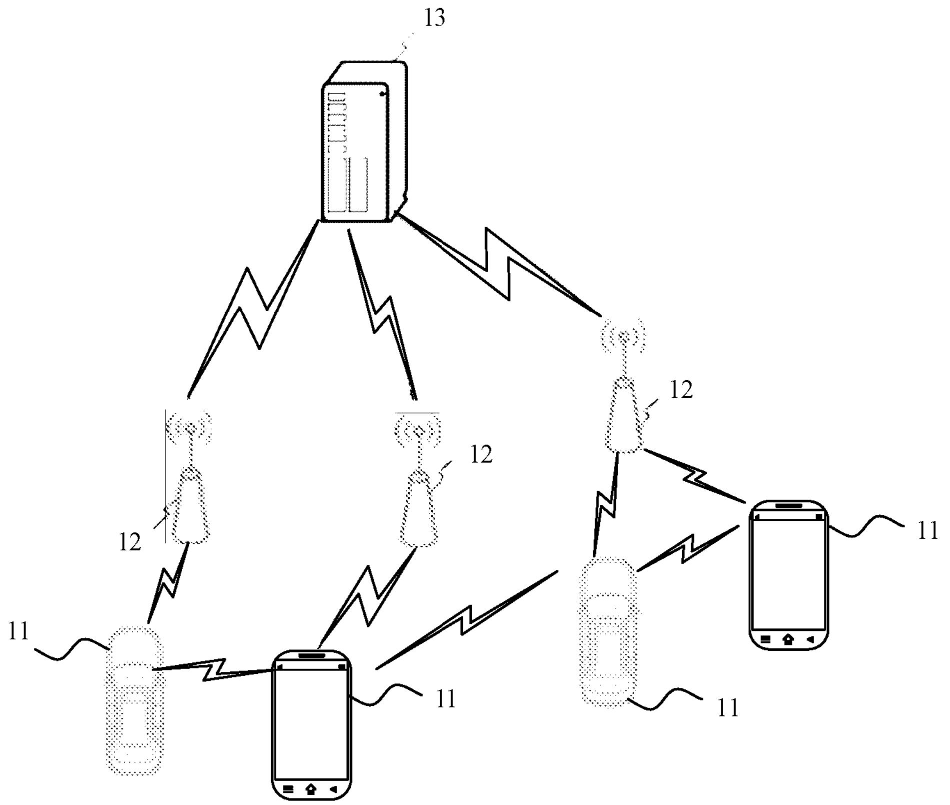
FIG. 1 is a schematic structural diagram of a wireless communication system according to an example.

FIG. 1 is a schematic structural diagram of a wireless communication system according to an example of the present disclosure. As shown in FIG. 1, the wireless communication system is a communication system based on a cellular mobile communication technology, and may include several terminals 11 and several base stations 12.

The terminal 11 may refer to a device that provides voice and/or data connectivity for a user. The terminal 11 may communicate with one or more core networks through a radio access network (RAN). The terminal 11 may be an Internet of Things (IOT) terminal, such as a sensor device, a mobile phone (or referred to as "cellular" phone), and a computer having the (IoT) terminal. For example, the terminal may be a fixed, portable, pocket-sized, handheld, computer-built-in, or vehicle-mounted apparatus. For example, the terminal may be a station (STA), a subscriber unit, a subscriber station, a mobile station, a mobile console, a remote station, an access point, a remote terminal, an access terminal, a user terminal, a user agent, a user device, or user equipment (UE). Alternatively, the terminal 11 may also be a device of an unmanned aerial vehicle. Alternatively, the terminal 11 may also be a vehicle-mounted device, for example, a vehicle computer with a wireless communication function, or a wireless communication device externally connected to the vehicle computer. Alternatively, the terminal 11 may also be a roadside device, for example, a street lamp, a signal lamp or other roadside device having a wireless communication function.

The base station 12 may be a network side device in the wireless communication system. The wireless communication system may be a 4th generation (4G) mobile communication system, which is also referred to as a long term evolution (LTE) system. Alternatively, the wireless communication system may also be a 5G system, also referred to as a new radio (NR) system or a 5G NR system. Alternatively, the wireless communication system may also be a next generation system of the 5G system. An access network in the 5G system may be referred to as a new generation-radio access network (NG-RAN). Alternatively, the wireless communication system may be an MTC system.

The base station 12 may be an evolved base station (eNB) adopted in the 4G system. Alternatively, the base station 12 may also be a base station using a centralized-distributed architecture (gNB) in the 5G system. In the case that the base station 12 adopts the centralized-distributed architecture, the base station 12 generally includes a central unit (CU) and at least two distributed units (DUs). The central unit is provided with protocol stacks of a Packet Data Convergence Protocol (PDCP) layer, a Radio Link Control (RLC) protocol layer and a Medium Access Control (MAC) layer. The distributed unit is provided with a protocol stack of a physical (PHY) layer. The implementations of the base station 12 are not limited in the examples of the disclosure.

A wireless connection may be established between the base station 12 and the terminal 11 through a wireless air interface. In various examples, the wireless air interface is a wireless air interface based on a fourth generation (4G) mobile communication network technology standard. Alternatively, the wireless air interface is a wireless air interface based on a fifth generation (5G) mobile communication network technology standard, for example, the wireless air interface is a new air interface. Alternatively, the wireless air interface may also be a wireless air interface based on a next generation mobile communication network technology standard of the 5G.

In some examples, an end to end (E2E) connection may also be established between terminals 11, such as vehicle to vehicle (V2V) communication, vehicle to infrastructure (V2I) communication, and vehicle to pedestrian (V2P) communication in vehicle to everything (V2X).

In some examples, the wireless communication system may further include a network management device 13.

Several base stations 12 are separately connected to the network management device 13. The network management device 13 may be a core network device in a wireless communication system. For example, the network management device 13 may be a mobility management entity (MME) in an evolved packet core (EPC). Alternatively, the network management device may also be other core network devices, such as a serving gateway (SGW), a public data network gateway (PGW), a policy and charging rules function (PCRF), or a home subscriber server (HSS). The implementation form of the network management device 13 is not limited in the examples of the present disclosure.

An execution body involved in the examples of the present disclosure includes but is not limited to: a UE such as a mobile phone terminal supporting cellular mobile communication, and a positioning server.

Figure 2:
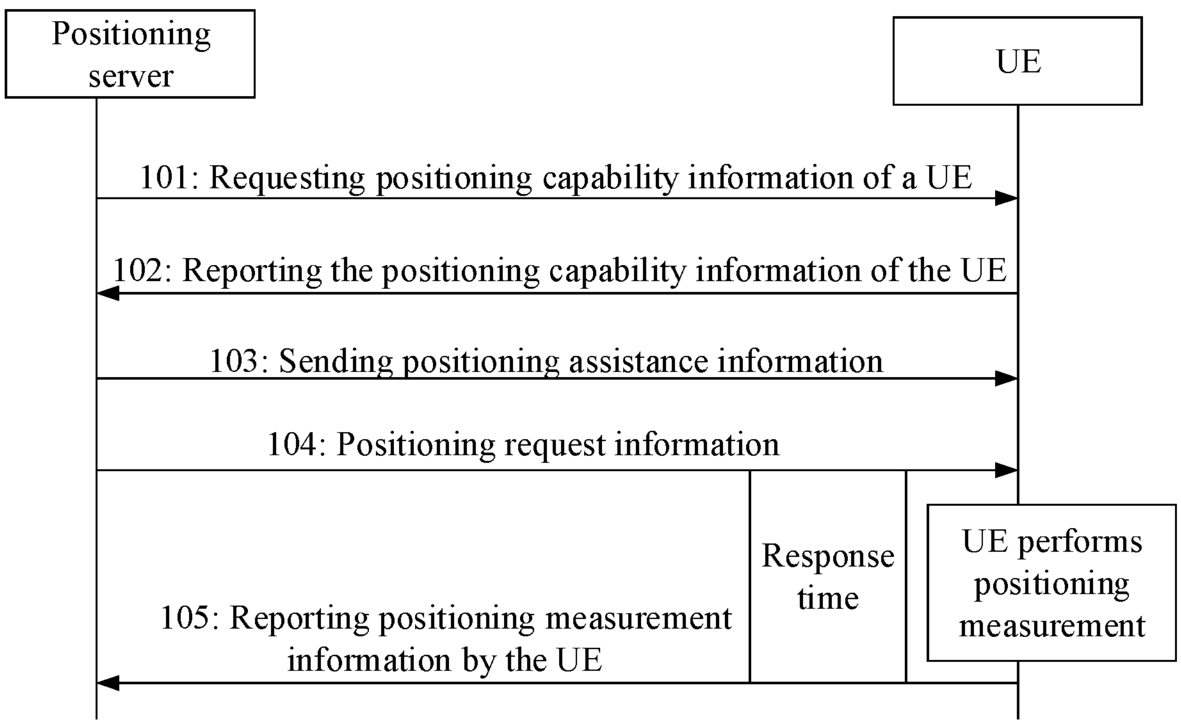
FIG. 2 is a schematic flowchart of a positioning measurement method according to a related art.

One application scenario of the examples of the present disclosure is that, in a related art, a positioning measurement process is shown in FIG. 2 and includes steps 101 to 105.

Step 101: an LMF positioning server firstly requests the UE to report positioning capability information of the UE.

Step 102: the UE reports the positioning capability information.

Step 103: the positioning server configures positioning assistance information for the UE according to the positioning measurement capability information and sends the positioning assistance information to the UE.

Step 104: in the case that the positioning measurement needs to be performed, the positioning server sends positioning request information.

Step 105: the UE reports related positioning measurement information after performing related positioning measurement.

This positioning measurement process includes many steps, and there is a delay between the steps, making the delay of the entire positioning measurement process relatively long. Accordingly, how to reduce the delay of the positioning measurement process and improve the efficiency of the positioning measurement is an urgent problem to be solved.

As shown in FIG. 3, there is provided an information transmission method according to an example of the present disclosure. The information transmission method may be performed by a UE of a cellular mobile communication system or the like, and includes step 301.

Step 301: in response to a positioning requirement triggered by the UE, sending positioning capability information to a positioning server, where the positioning capability information is configured to indicate positioning measurement capability of the UE.

The UE may be a mobile terminal or the like that performs wireless communication using a cellular mobile communication technology.

The positioning server may be a separate dedicated server or may also be a network element in a core network of the cellular mobile communication system. For example, the positioning server may be a location management function (LMF) in a core network of a 5G cellular mobile communication system.

The positioning server may provide positioning services, or may also provide other services simultaneously. The positioning server and the UE may communicate with each other through at least one of a wired connection or a wireless connection.

The positioning capability information may indicate the positioning measurement capability of the UE. The positioning measurement capability may be a capability of the UE to determine a position of the UE with the help of a reference object. The positioning measurement capability may include positioning modes that the UE may support.

For example, the positioning measurement capability of the UE relates to at least one of: a positioning mode supported by the UE; positioning precision supported by the UE; whether the UE supports positioning; or a type of a positioning signal that the UE can use.

For example, types of positioning signals that the UE can use include, but are not limited to: wireless signals of cellular mobile communications and/or positioning signals sent by positioning satellites, or the like.

The positioning mode for performing positioning according to the wireless signal sent by the base station may include, but is not limited to: observed time difference of arrival (OTDOA) positioning, uplink time difference of arrival (UTDOA) positioning, and the like.

The positioning mode for performing positioning according to the positioning information sent by the positioning satellite may include, but is not limited to: network-assisted global navigation satellite system (GNSS) positioning, global positioning system (GPS) positioning, and the like.

The UE can actively send the positioning capability information of the UE to the positioning server. This reduces the interaction of information and the delay generated during the interaction process.

In an example, the positioning requirement includes at least one of: a positioning requirement within the UE; or access to a network by the UE.

The positioning requirement may be generated within the UE. For example, the positioning requirement may be generated by an application software running within the UE. The positioning capability information may be reported, triggered by the positioning requirement.

In the case that the UE has a positioning requirement, the UE can directly send the positioning capability information to the positioning server.

For example, the UE having a positioning requirement includes, but is not limited to: detecting the start of a positioning-related service, for example, a mapping application or a taxi hailing application is started, or a positioning-related service in a social application program is started, the UE may send the positioning capability information to the positioning server; detecting the start of positioning-related communications, for example, in some SL-based communication processes, the positioning information of the UE may be used, in this case, in response to detecting the start of SL communication in a specific scenario, the current UE can be considered to have a positioning requirement.

The UE may send the positioning capability information to the positioning server during accessing the cellular mobile communication network. The positioning server may store the positioning capability information. In the case that the UE is directly switched between different cells or base stations, the positioning server can constantly determine the positioning measurement capability of the UE. In the case that the positioning server has a positioning requirement, the positioning server does not need to request the positioning measurement capability of the UE.

The UE can actively send the positioning capability information of the UE to the positioning server. In this way, in a first aspect, in the case that the positioning server needs to indicate the UE to perform positioning, the positioning server can know the positioning capability of the UE according to the positioning capability information sent by the UE without indicating the UE to report the positioning capability information; in a second aspect, the UE can be directly indicated to perform positioning, so that delay of positioning is reduced; in a third aspect, the UE actively sends the positioning capability information of the UE, so that the signaling overhead generated by the positioning server indicating the UE to report the positioning capability information is reduced.

In an example, the UE may send the positioning capability information directly to the positioning server, such as an LMF via the LPP protocol.

In an example, sending the positioning capability information to the positioning server includes: forwarding the positioning capability information to the positioning server through a base station.

The UE may report the positioning capability information to the base station in a manner of carrying the positioning capability information in uplink signaling such as RRC signaling, and the base station may forward the positioning capability information to the positioning server. The positioning server may include access and mobility management function (AMF), LMF, and the like.

For example, the UE may carry the positioning capability information in signaling such as RRC connection request signaling, RRC connection completion signaling, and/or RRC reconfiguration request signaling, and send the signaling to the base station. Alternatively, the UE may carry the positioning capability information in an attachment request or a tracking area updating request.

In this way, the UE can send the positioning capability information to the positioning server in various modes, and the flexibility of reporting the positioning capability information is improved.

Referring to FIG. 4, there is provided an information transmission method according to an example. The information transmission method may be performed by a UE of a cellular mobile communication system or the like, and includes step 401.

Step 401: receiving a first positioning request of the positioning server, where the first positioning request indicates the UE to perform the first positioning measurement.

The first positioning request further includes first positioning assistance information, the first positioning assistance information being at least configured to indicate the UE to perform configuration of the first positioning measurement; and the first positioning request is determined by the positioning server based on the positioning capability information.

In the case that it is determined that there is a positioning requirement for the UE, the positioning server may send the first positioning request to the UE to indicate that the UE to perform the first positioning measurement.

The positioning server may carry the first positioning assistance information in the first positioning request, and the first positioning assistance information may at least indicate the configuration needed for the UE to perform the first positioning measurement.

The first positioning assistance information may be determined by the positioning server based on the positioning measurement capability of the UE. The first positioning assistance information may indicate, but is not limited to: a positioning mode used by the UE, a configuration needed when the positioning mode is used, and the like.

For example, taking OTDOA positioning as an example, an OTDOA positioning method is implemented according to the following principle, where a positioning server specifies the positioning reference signal (PRS) for a base station and the UE, and the PRS is sent downlink by the base station. The UE receives the PRSs from a plurality of base stations, identifies the arrival time of each PRS, obtains a time difference of arrival of PRS between different base stations, that is, reference signal time difference (RSTD), and reports the time difference of arrival of PRS to the positioning server. The positioning server receives the time difference of arrival of the reference signals of different base stations through the UE, the time difference can be mapped into the distance difference between the UE and the different base stations, and the accurate position of the UE can be obtained through mathematical calculation of a hyperbolic model and the like.

In the OTDOA positioning, the first positioning assistance information may include cell identity of the base station that sends the PRS, PRS configuration, and the like. The UE may receive PRSs from different base stations based on the first positioning assistance information. The positioning request and the positioning assistance information may correspond to different messages, and the positioning server may need to perform at least two interactions to complete sending the positioning request and the positioning assistance information.

According to the examples of the present disclosure, the positioning server carries the first positioning assistance information in the first positioning request, and completes the transmission of the positioning request and the positioning assistance information through one information transmission. In this way, the delay generated by a plurality of interactions is reduced, the information transmission load is reduced, and the efficiency of the positioning measurement process is improved.

In an example, the method further includes: performing the first positioning measurement based on the first positioning request and the first positioning assistance information; and sending to the positioning server a measurement result obtained by performing the first positioning measurement.

The UE may perform the first positioning measurement based on the configuration indicated by the first positioning assistance information and send the measurement result to the positioning server. The positioning server may position the UE based on the measurement result.

For example, taking OTDOA positioning as an example, the first positioning assistance information may include cell identity of the base station that sends the PRS, PRS configuration, and the like. The UE may receive PRSs from different base stations based on the first positioning assistance information, measure arrival times of the PRSs, and send the arrival times to the positioning server.

The positioning server converts the time difference of arrival of PRSs from different base stations received by the UE into the distance difference between the UE and different base stations, and the positioning server can obtain the accurate position of the UE through mathematical calculations such as a hyperbolic model.

In an example, the first positioning request further includes a time parameter, configured to indicate time information for the UE to perform the first positioning measurement; and performing the first positioning measurement based on the first positioning request and the first positioning assistance information includes: performing the first positioning measurement based on the time parameter.

The first positioning request may carry the time parameter indicating the time information for the UE to perform the first positioning measurement.

The time parameter may indicate an absolute moment, and may also indicate a relative moment. For example, the time parameter may indicate a time difference between a moment at which the UE performs the first positioning measurement and a moment at which the first positioning request is received.

The time parameter indicates, but is not limited to, one of the following: a start moment of the positioning measurement; a time offset, where the time offset may be a time offset value relative to a transmission time stamp of the first positioning request; or an end moment of the positioning measurement, which is equivalent to indicating the UE to start or complete the positioning measurement at least before the end moment.

For example, the first positioning request may carry a time parameter t, where the time parameter t notifies the UE to perform the first positioning measurement t seconds after receiving the positioning request information, where t may be 0 or an integer greater than 0.

In an example, the time parameter may be a timer parameter, and is used to configure a timing duration of the timer. After the time parameter is received, the time parameter is used to configure the timer. In the case that the configured timer overflows, the UE performs the first positioning measurement.

In this way, by carrying the time parameter in the first positioning request, the time for the UE to perform the first positioning measurement can be flexibly controlled.

In an example, the method further includes: sending a second positioning request to the positioning server, where the second positioning request indicates the UE to perform second positioning measurement; receiving second positioning assistance information sent by the positioning server in response to the second positioning request, where the second positioning assistance information is at least configured to indicate the UE to perform configuration of the second positioning measurement; and where the second positioning assistance information is determined by the positioning server based on the positioning capability information; and performing the second positioning measurement based on the second positioning assistance information.

The second positioning request may be generated within the UE. For example, the second positioning request may be generated by an application software running within the UE.

The second positioning request may indicate to the positioning server that the UE needs to perform the second location measurement. The first positioning measurement and the second positioning measurement may be the same or different.

Since the positioning server stores the positioning capability information of the UE, the positioning server may send the second positioning assistance information to the UE based on the second positioning request. The first positioning assistance information and the second positioning assistance information may be the same or different. The manner of determining the second positioning assistance information by the positioning server is similar to the manner of determining the first positioning assistance information by the positioning server, and the role of the second positioning assistance information is similar to the role of the first positioning assistance information. Details are not described again.

The UE may complete the second positioning measurement based on the second positioning assistance information, and send the obtained measurement result to the positioning server for the positioning server to position the UE.

In this way, the UE sends the positioning capability information in advance, and the positioning server does not need to request the positioning capability information after the UE sends the second positioning request, so that the information interaction is reduced, the delay caused by the information interaction is reduced, and the efficiency of the positioning measurement process is improved.

The example shown in FIG. 4 may be implemented alone or in combination with other examples of the present disclosure. For example, the example shown in FIG. 4 may be performed together with the example shown in FIG. 3.

Figures 5, 6:
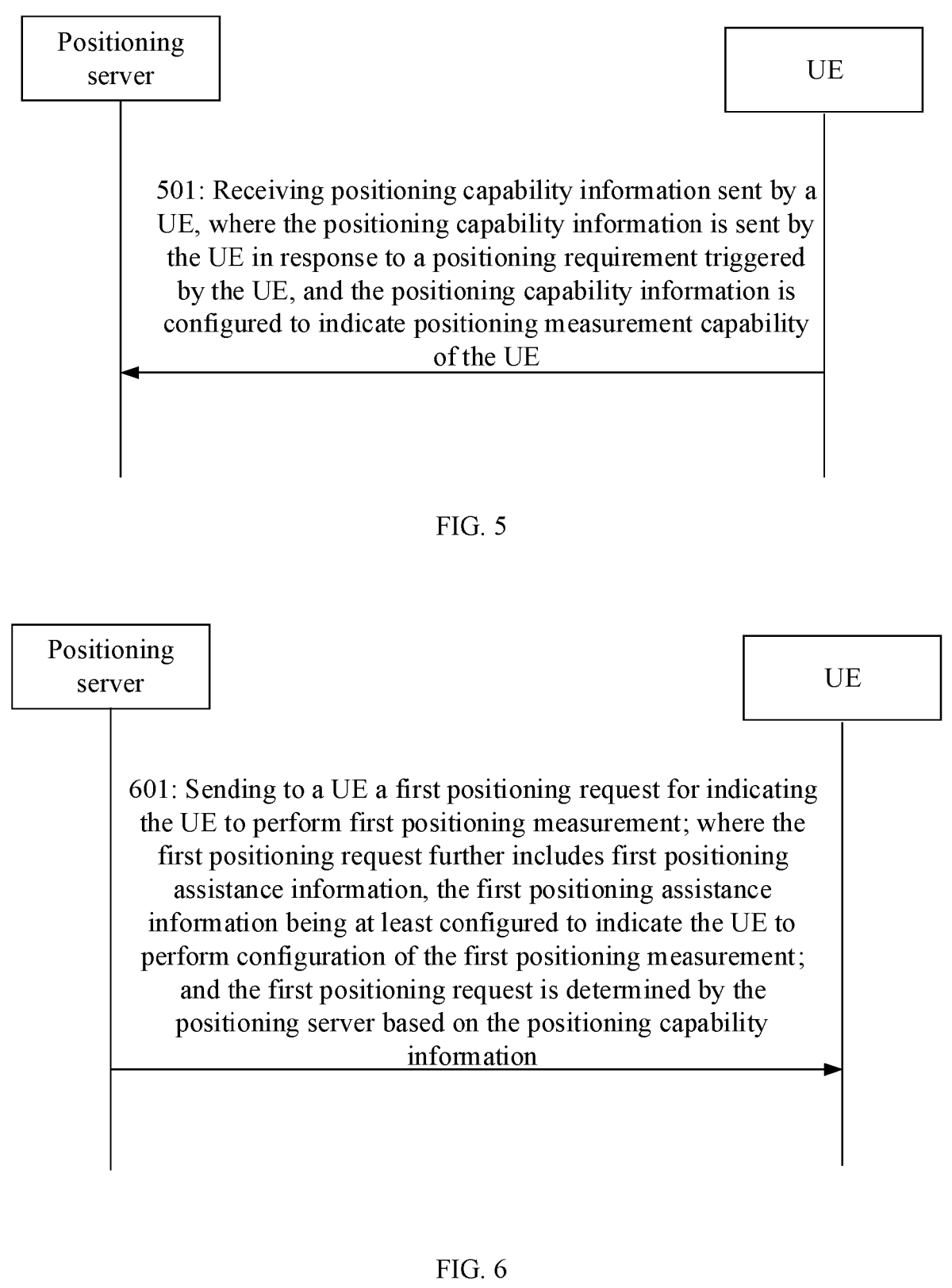

As shown in FIG. 5, there is provided an information transmission method according to an example. The information transmission method may be performed by a positioning server of a cellular mobile communication system or the like, and includes step 501.

Step 501: receiving positioning capability information sent by a user equipment (UE), where the positioning capability information is sent by the UE in response to a positioning requirement triggered by the UE, and the positioning capability information is configured to indicate the positioning measurement capability of the UE.

The UE may be a mobile terminal or the like that performs wireless communication using a cellular mobile communication technology.

The positioning server may be a separate dedicated server or may also be a network element in a core network of the cellular mobile communication system. For example, the positioning server may be a location management function (LMF) in a core network of a 5G cellular mobile communication system.

The positioning server may provide positioning services, or may also provide other services simultaneously. The positioning server and the UE may communicate with each other through at least one of a wired connection or a wireless connection.

The positioning capability information may indicate the positioning measurement capability of the UE. The positioning measurement capability may be a capability of the UE to determine a position of the UE with the help of a reference object. The positioning measurement capability may include positioning modes that the UE may support.

For example, the positioning measurement capability of the UE relates to at least one of: a positioning mode supported by the UE; positioning precision supported by the UE; whether the UE supports positioning; or a type of a positioning signal that the UE can use.

For example, types of positioning signals that the UE can use include, but are not limited to: wireless signals of cellular mobile communications and/or positioning signals sent by positioning satellites, or the like.

The positioning mode for performing positioning according to the wireless signal sent by the base station may include, but is not limited to: observed time difference of arrival (OTDOA) positioning, uplink time difference of arrival (UTDOA) positioning, and the like.

The positioning mode for performing positioning according to the positioning information sent by the positioning satellite may include, but is not limited to: network-assisted global navigation satellite system (GNSS) positioning, global positioning system (GPS) positioning, and the like.

The UE can actively send the positioning capability information of the UE to the positioning server. This reduces the interaction of information and the delay generated during the interaction process.

In an example, the positioning requirement includes at least one of: a positioning requirement within the UE; or access to a network by the UE.

The positioning requirement may be generated within the UE. For example, the positioning requirement may be generated by an application software running within the UE. The positioning capability information may be reported triggered by the positioning requirement.

In the case that the UE has a positioning requirement, the UE can directly send the positioning capability information to the positioning server.

For example, the UE having a positioning requirement includes, but is not limited to: detecting the start of a positioning-related service, for example, a mapping application or a taxi hailing application is started, or a positioning-related service in a social application program is started, the UE may send the positioning capability information to the positioning server; detecting the start of positioning-related communications, for example, in some SL-based communication processes, the positioning information of the UE may be used, in this case, if the start of SL communication in a specific scenario is detected, the current UE can be considered to have a positioning requirement.

The UE may send the positioning capability information to a positioning server during accessing the cellular mobile communication network. The positioning server may store the positioning capability information. In the case that the UE is directly switched between different cells or base stations, the positioning server can constantly determine the positioning measurement capability of the UE. In the case that the positioning server has a positioning requirement, the positioning server does not need to request the positioning measurement capability of the UE.

The UE can actively send the positioning capability information of the UE to the positioning server. In this way, in a first aspect, in the case that the positioning server needs to indicate the UE to perform positioning, the positioning server can know the positioning capability of the UE according to the positioning capability information sent by the UE without indicating the UE to report the positioning capability information; in a second aspect, the UE can be directly indicated to perform positioning, so that delay of positioning is reduced; in a third aspect, the UE actively sends the positioning capability information of the UE, so that the signaling overhead generated by the positioning server indicating the UE to report the positioning capability information is reduced.

In an example, the UE may send the positioning capability information directly to the positioning server such as an LMF via LPP protocol.

In an example, receiving the positioning capability information sent by the user equipment (UE) includes: receiving the positioning capability information forwarded through a base station.

The UE may report the positioning capability information to the base station in a manner of carrying the positioning capability information in uplink signaling such as RRC signaling, and the base station may forward the positioning capability information to the positioning server. The positioning server may include access and mobility management function (AMF), LMF, and the like.

For example, the UE may carry the positioning capability information in signaling such as RRC connection request signaling, RRC connection completion signaling, and/or RRC reconfiguration request signaling, and send the signaling to the base station. Alternatively, the UE may carry the positioning capability information in an attachment request or a tracking area updating request.

In this way, the UE can send the positioning capability information to the positioning server in various modes, and the flexibility of reporting the positioning capability information is improved.

Referring to FIG. 6, there is provided an information transmission method according to an example. The information transmission method may be performed by a positioning server of a cellular mobile communication system or the like, and includes step 601.

Step 601: sending to a UE a first positioning request for indicating the UE to perform first positioning measurement.

The first positioning request further includes first positioning assistance information, the first positioning assistance information being at least configured to indicate the UE to perform configuration of the first positioning measurement; and the first positioning request is determined by the positioning server based on the positioning capability information.

In the case that it is determined that there is a positioning requirement for the UE, the positioning server may send the first positioning request to the UE to indicate the UE to perform the first positioning measurement.

The positioning server may carry the first positioning assistance information in the first positioning request, and the first positioning assistance information may at least indicate the configuration needed for the UE to perform the first positioning measurement.

The first positioning assistance information may be determined by the positioning server based on the positioning measurement capability of the UE. The first positioning assistance information may indicate, but is not limited to: a positioning mode used by the UE, a configuration needed in the case that the positioning mode is used, and the like.

For example, taking OTDOA positioning as an example, an OTDOA positioning method is implemented according to the following principle, where a positioning server specifies the positioning reference signal (PRS) for a base station and the UE, and the PRS is sent downlink by the base station. The UE receives the PRSs from a plurality of base stations, identifies the arrival time of each PRS, obtains a time difference of arrival of PRS between different base stations, that is, reference signal time difference (RSTD), and reports the time difference of arrival of PRS to the positioning server. The positioning server receives the time difference of arrival of the reference signals of different base stations through the UE, the time difference can be mapped into the distance difference between the UE and the different base stations, and the accurate position of the UE can be obtained through mathematical calculation of a hyperbolic model and the like.

In the OTDOA positioning, the first positioning assistance information may include cell identity of the base station that sends the PRS, PRS configuration, and the like. The UE may receive PRSs from different base stations based on the first positioning assistance information.

The positioning request and the positioning assistance information may correspond to different messages, and the positioning server may need to perform at least two interactions to complete sending the positioning request and the positioning assistance information.

According to the examples of the present disclosure, the positioning server carries the first positioning assistance information in the first positioning request, and completes the transmission of the positioning request and the positioning assistance information through one information transmission. In this way, the delay generated by a plurality of interactions is reduced, the information transmission load is reduced, and the efficiency of the positioning measurement process is improved.

In an example, the method further includes: receiving a measurement result obtained by the UE by performing the first positioning measurement in response to the first positioning request.

The UE may perform the first positioning measurement based on the configuration indicated by the first positioning assistance information and send the measurement result to the positioning server. The positioning server may position the UE based on the measurement result.

For example, taking OTDOA positioning as an example, the first positioning assistance information may include cell identity of the base station that sends the PRS, PRS configuration, and the like. The UE may receive PRSs from different base stations based on the first positioning assistance information, measure arrival times of the PRSs, and send the arrival times to the positioning server.

The positioning server converts the time difference of arrival of PRSs from different base stations received by the UE into the distance difference between the UE and different base stations, and the positioning server can obtain the accurate position of the UE through mathematical calculations such as a hyperbolic model.

In an example, the first positioning request further includes a time parameter, configured to indicate time information for the UE to perform the first positioning measurement; and receiving the measurement result obtained by the UE by performing the first positioning measurement in response to the first positioning request includes: receiving the measurement result obtained by the UE by performing the first positioning measurement based on the time parameter.

The first positioning request may carry the time parameter indicating the time information for the UE to perform the first positioning measurement.

The time parameter may indicate an absolute moment, and may also indicate a relative moment. For example, the time parameter may indicate a time difference between a moment at which the UE performs the first positioning measurement and a moment at which the first positioning request is received.

The time parameter indicates, but is not limited to, one of the following: a start moment of the positioning measurement; a time offset, where the time offset may be a time offset value relative to a transmission time stamp of the first positioning request; or an end moment of the positioning measurement, which is equivalent to indicating the UE to start or complete the positioning measurement at least before the end moment.

For example, the first positioning request may carry a time parameter t, where the time parameter t notifies the UE to perform the first positioning measurement t seconds after receiving the positioning request information, where t may be 0 or an integer greater than 0.

In an example, the time parameter may be a timer parameter, and is used to configure a timing duration of the timer. After the time parameter is received, the time parameter is used to configure the timer. In the case that the configured timer overflows, the UE performs the first positioning measurement.

In this way, by carrying the time parameter in the first positioning request, the time for the UE to perform the first positioning measurement can be flexibly controlled.

In an example, the method further includes: receiving a second positioning request sent by the UE, where the second positioning request indicates the UE to perform second positioning measurement; and in response to the second positioning request, sending second positioning assistance information, where the second positioning assistance information is at least configured to indicate the UE to perform configuration of the second positioning measurement; and where the second positioning assistance information is determined by the positioning server based on the positioning capability information.

The second positioning request may be generated within the UE. For example, the second positioning request may be generated by an application software running within the UE.

The second positioning request may indicate to the positioning server that the UE needs to perform the second positioning measurement. The first positioning measurement and the second positioning measurement may be the same or different.

Since the positioning server stores the positioning capability information of the UE, the positioning server may send the second positioning assistance information to the UE based on the second positioning request. The first positioning assistance information and the second positioning assistance information may be the same or different. The manner of determining the second positioning assistance information by the positioning server is similar to the manner of determining the first positioning assistance information by the positioning server, and the role of the second positioning assistance information is similar to the role of the first positioning assistance information. Details are not described again.

The UE may complete the second positioning measurement based on the second positioning assistance information, and send the obtained measurement result to the positioning server for the positioning server to position the UE.

In this way, the UE sends the positioning capability information in advance, and the positioning server does not need to request the positioning capability information after the UE sends the second positioning request, so that the information interaction is reduced, the delay caused by the information interaction is reduced, and the efficiency of the positioning measurement process is improved.

The example shown in FIG. 6 may be implemented alone or in combination with other examples of the present disclosure. For example, the example shown in FIG. 6 may be performed together with the example shown in FIG. 5.

In an example, the UE sends the positioning capability information to the positioning server based on a positioning requirement.

The positioning requirement may be generated within the UE. For example, the positioning requirement may be generated by an application software running within the UE. The positioning capability information may be reported, triggered by the positioning requirement.

In the case that the UE has a positioning requirement, the UE can directly send the positioning capability information to the positioning server.

For example, the UE having a positioning requirement includes, but is not limited to: detecting the start of a positioning-related service, for example, a mapping application or a taxi hailing application is started, or a positioning-related service in a social application program is started, the UE may send the positioning capability information to the positioning server; detecting the start of positioning-related communications, for example, in some SL-based communication processes, the positioning information of the UE may be used, in this case, in response to the start of SL communication in a specific scenario being detected, the current UE can be considered to have a positioning requirement.

One specific example is provided below in connection with any of the examples described above: this example provides a positioning measurement method with low delay, the positioning capability information of the UE is directly reported to the positioning server or the base station by the UE, and the positioning server simultaneously sends the positioning assistance information and the positioning request to the UE to reduce the delay of the positioning measurement.

Figures 7, 8:
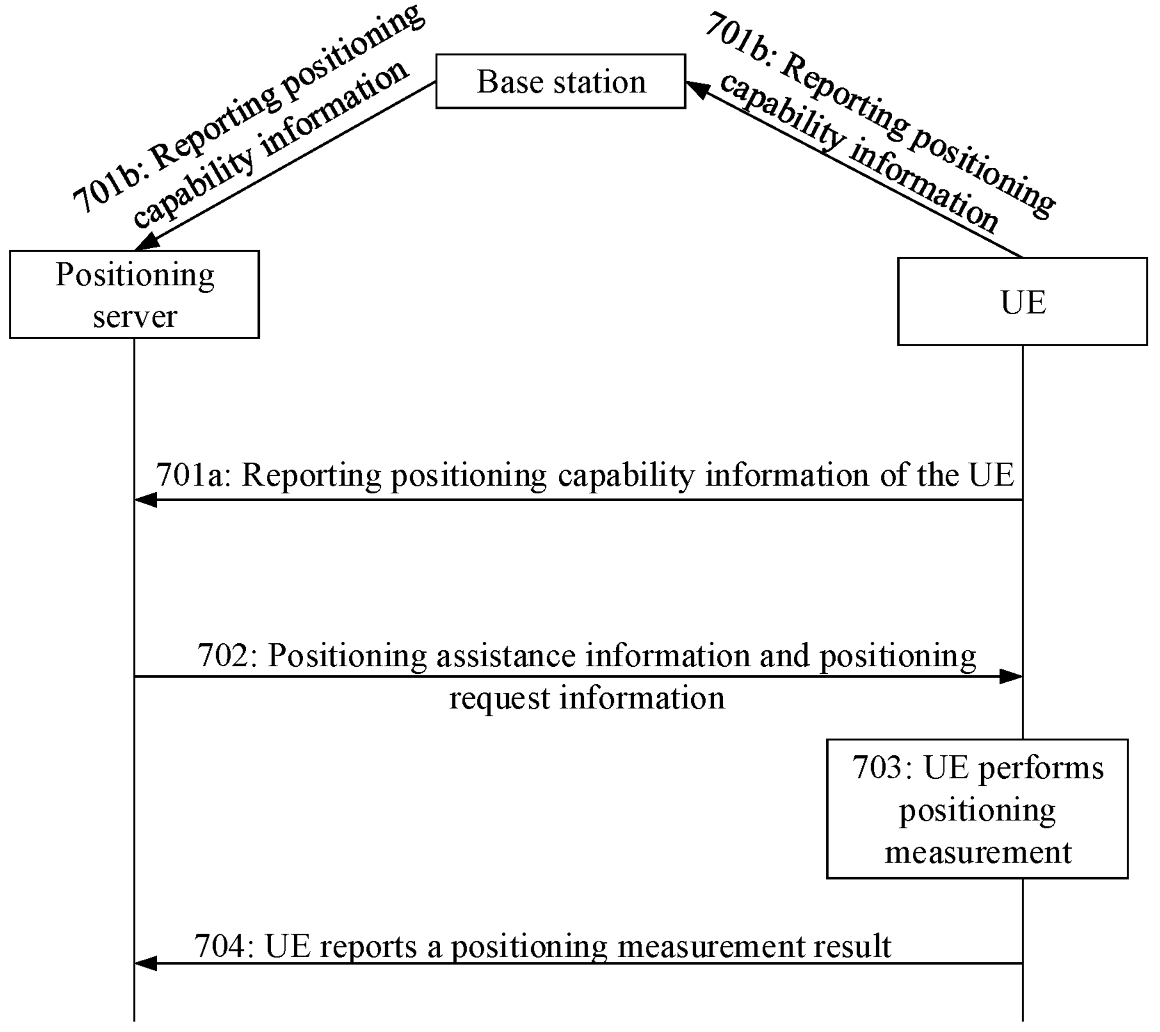
FIG. 7 is a schematic flowchart of LPP positioning measurement according to an example.
FIG. 8 is a block diagram of an information transmission apparatus according to an example.

As shown in FIG. 7, the LPP positioning measurement process includes steps 701 to 704.

Step 701: the UE sends the positioning capability information of the UE to the positioning server in the following two ways.

Step 701*a*: the UE reports the positioning capability information of the UE to a positioning server LMF.

Step 701*b*: the UE reports the positioning capability information of the UE to the base station in an RRC signaling mode, and the base station forwards the positioning capability information of the UE to a positioning server AMF/LMF in a transparent transmission mode.

Step 702: the positioning server sends positioning assistance information (Provide Assistance Data) and positioning request information (Request Location Information message) to the UE, where the positioning request information may be configured with a time parameter t, and the time parameter t is configured to notify the UE to perform positioning measurement t seconds after receiving the positioning request information, where t may be 0 or an integer greater than 0.

Step 703: the UE receives the positioning assistance information and the positioning request information in the step 702, and performs corresponding positioning measurement.

Step 704: after completing the positioning measurement in the step 703, the UE reports positioning measurement result to the positioning server.

An example of the present disclosure further provides an information transmission apparatus, which may be applied to a UE in wireless communication. As shown in FIG. 8, the information transmission apparatus 100 includes a first sending module 110.

The first sending module 110 is configured to, in response to a positioning requirement triggered by the UE, send positioning capability information to a positioning server, where the positioning capability information is configured to indicate positioning measurement capability of the UE.

An example of the present disclosure further provides an information transmission apparatus, which may be applied to a UE in wireless communication. As shown in FIG. 9, the information transmission apparatus 100 includes a first receiving module 120.

The first receiving module 120 is configured to receive a first positioning request of the positioning server, where the first positioning request indicates the UE to perform the first positioning measurement.

The first positioning request further includes first positioning assistance information, the first positioning assistance information being at least configured to indicate the UE to perform configuration of the first positioning measurement; and the first positioning request is determined by the positioning server based on the positioning capability information.

The information transmission apparatus of the example shown in FIG. 9 may also include modules shown in other examples of the present disclosure, for example, may include a module as shown in FIG. 8. As shown in FIG. 9:

In some examples, the information transmission apparatus 100 further includes a first measurement module 130.

The first measurement module 130 is configured to perform the first positioning measurement based on the first positioning request and the first positioning assistance information.

The first sending module 110 is further configured to send a measurement result obtained by performing the first positioning measurement to the positioning server.

In an example, the first positioning request further includes a time parameter, configured to indicate time information for the UE to perform the first positioning measurement.

The first measurement module 130 is configured to perform the first positioning measurement based on the time parameter.

In an example, the first sending module 110 is further configured to send a second positioning request to the positioning server, where the second positioning request indicates the UE to perform a second positioning measurement; and the information transmission apparatus 100 further includes: a second receiving module 140, configured to receive second positioning assistance information sent by the positioning server in response to the second positioning request, where the second positioning assistance information is at least configured to indicate the UE to perform configuration of the second positioning measurement; and where the second positioning assistance information is determined by the positioning server based on the positioning capability information; and a second measurement module 150, configured to perform the second positioning measurement based on the second positioning assistance information.

In an example, the first sending module 110 is configured to forward the positioning capability information to the positioning server through a base station.

In an example, the positioning requirement includes at least one of: a positioning requirement within the UE; or access to a network by the UE.

An example of the present disclosure further provides an information transmission apparatus, which may be applied to a positioning server in wireless communication. As shown in FIG. 10, the information transmission apparatus 200 includes a third receiving module 210.

The third receiving module 210 is configured to receive positioning capability information sent by a user equipment (UE), where the positioning capability information is sent by the UE in response to a positioning requirement triggered by the UE, and the positioning capability information is configured to indicate positioning measurement capability of the UE.

An example of the present disclosure further provides an information transmission apparatus, which may be applied to a positioning server in wireless communication. As shown in FIG. 11, the information transmission apparatus 200 includes a second sending module 220.

The second sending module 220 is configured to send to the UE a first positioning request for indicating the UE to perform the first positioning measurement.

The first positioning request further includes first positioning assistance information, the first positioning assistance information being at least configured to indicate the UE to perform configuration of the first positioning measurement; and the first positioning request is determined by the positioning server based on the positioning capability information.

The information transmission apparatus of the example shown in FIG. 11 may also include modules shown in other examples of the present disclosure, for example, may include a module as shown in FIG. 10.

As shown in FIG. 11: in an example, the third receiving module 210 is further configured to receive a measurement result obtained by the UE by performing the first positioning measurement in response to the first positioning request.

In an example, the first positioning request further includes a time parameter, configured to indicate time information for the UE to perform the first positioning measurement.

The third receiving module 210 is further configured to receive the measurement result obtained by the UE by performing the first positioning measurement based on the time parameter.

In an example, the third receiving module 210 is further configured to receive a second positioning request sent by the UE, where the second positioning request indicates the UE to perform second positioning measurement; and the information transmission apparatus 200 further includes a third sending module 230, configured to, in response to the second positioning request, send second positioning assistance information, where the second positioning assistance information is at least configured to indicate the UE to perform configuration of the second positioning measurement; and where the second positioning assistance information is determined by the positioning server based on the positioning capability information.

In an example, the third receiving module 210 is configured to receive the positioning capability information forwarded through a base station.

In an example, the positioning requirement includes at least one of: a positioning requirement within the UE; or access to a network by the UE.

In an example, the first sending module 110, the first receiving module 120, the first measurement module 130, the second receiving module 140, the second measurement module 150, the third receiving module 210, the second sending module 220, the third sending module 230, and the like may be implemented by one or more of a central processing unit (CPU), a graphics processing unit (GPU), a baseband processor (BP), an application specific integrated circuit (ASIC), a DSP, a programmable logic device (PLD), a complex programmable logic device (CPLD), a field-programmable gate array (FPGA), a general-purpose processor, a controller, a micro controller unit (MCU), a microprocessor, or other electronic component, and are configured to perform the foregoing methods.

Figure 12:
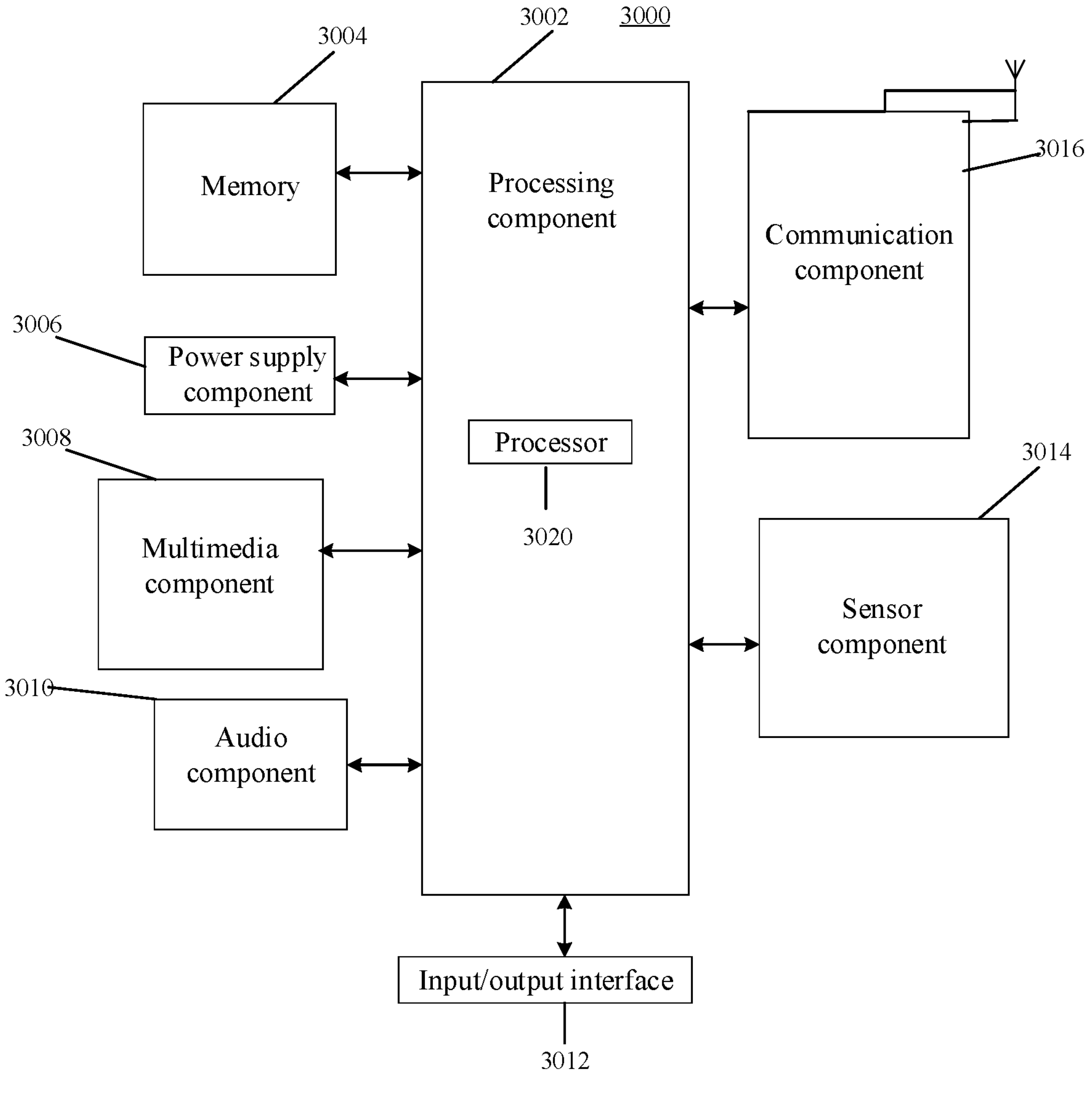
FIG. 12 is a block diagram of an apparatus for information transmission according to an example.

FIG. 12 is a block diagram of an apparatus 3000 for information transmission according to an example. For example, the apparatus 3000 may be a mobile phone, a computer, a digital broadcast terminal, a messaging device, a game console, a tablet device, a medical device, an exercise device, a personal digital assistant, and the like.

Referring to FIG. 12, the apparatus 3000 may include one or more of the following components: a processing component 3002, a memory 3004, a power supply component 3006, a multimedia component 3008, an audio component 3010, an input/output (I/O) interface 3012, a sensor component 3014, and a communication component 3016.

The processing component 3002 generally controls the overall operation of the apparatus 3000, such as operations associated with display, telephone calls, data communications, camera operations, and recording operations. The processing component 3002 may include one or more processors 3020 to execute instructions to complete all or part of the steps of the methods described above. In addition, the processing component 3002 may include one or more modules to facilitate interaction between the processing component 3002 and other components. For example, the processing component 3002 may include a multimedia module to facilitate interaction between the multimedia component 3008 and the processing component 3002.

The memory 3004 is configured to store various types of data to support operations at the apparatus 3000. Examples of such data include instructions for any application or method operating on the apparatus 3000, contact data, address book data, messages, pictures, videos, and the like. The memory 3004 may be implemented by any type of volatile or non-volatile storage device or a combination of these devices, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The power supply component 3006 provides power to the various components of the apparatus 3000. The power supply component 3006 may include a power supply management system, one or more power supplies, and other components associated with generating, managing, and distributing power to the apparatus 3000.

The multimedia component 3008 includes a screen that provides an output interface between the apparatus 3000 and a user. In some examples, the screen may include a liquid crystal display (LCD) and a touch panel (TP). In the case that the screen includes a touch panel, the screen may be implemented as a touch screen to receive an input signal from a user. The touch panel includes one or more touch sensors to sense touching, sliding, and a gesture on the touch panel. The touch sensor may not only sense a boundary of a touch action or a slide action, but also detect duration and a pressure related to the touch operation or the slide operation. In some examples, the multimedia component 3008 includes a front-facing camera and/or a rear-facing camera. The front-facing camera and/or the rear-facing camera may receive external multimedia data when the apparatus 3000 is in an operating mode, such as a photographing mode or a video mode. Each front-facing camera and rear-facing camera may be a fixed optical lens system that has a focal length and an optical zoom capability.

The audio component 3010 is configured to output and/or input an audio signal. For example, the audio component 3010 may include a microphone (MIC), and the microphone is configured to receive external audio signals when the apparatus 3000 is in an operational mode, such as a call mode, a recording mode, and a voice recognition mode. The received audio signal may further be stored in the memory 3004 or transmitted via the communication component 3016. In some examples, the audio component 3010 further includes a speaker configured to output an audio signal.

The I/O interface 3012 provides an interface between the processing component 3002 and a peripheral interface module, where the peripheral interface module may be a keyboard, a click wheel, a button, and the like. These buttons may include, but are not limited to: home button, volume buttons, start button, and lock button.

The sensor component 3014 includes one or more sensors, configured to provide status evaluation in various aspects for the apparatus 3000. For example, the sensor component 3014 can detect the on/off state of the apparatus 3000, the relative positioning of components such as a display and keypad of the apparatus 3000. The sensor component 3014 can also detect a change in the position of the apparatus 3000 or a component of the apparatus 3000, the presence or absence of user contact with the apparatus 3000, an orientation or acceleration/deceleration of the apparatus 3000, and a change in the temperature of the apparatus 3000. The sensor component 3014 may include a proximity sensor, configured to detect the presence of a nearby object in the absence of any physical contact. The sensor component 3014 may further include an optical sensor, such as a CMOS or CCD image sensor, configured to be used in an imaging application. In some examples, the sensor assembly 3014 may further include an acceleration sensor, a gyroscope sensor, a magnetic sensor, a pressure sensor, or a temperature sensor.

The communication component 3016 is configured to facilitate a wired or wireless communication between the apparatus 3000 and other devices. The apparatus 3000 may access a wireless network based on a communication standard, such as Wi-Fi, 2G, or 3G, or a combination of the Wi-Fi, 2G and 3G. In an example, the communication component 3016 receives a broadcast signal or broadcast associated information from an external broadcast management system via a broadcast channel. In an example, the communication component 3016 further includes a near field communication (NFC) module to facilitate short range communications. For example, the NFC module may be implemented based on radio frequency identification (RFID) technology, infrared data association (IrDA) technology, ultra-wideband (UWB) technology, Bluetooth (BT) technology, and other technologies.

In an example, the apparatus 3000 may be implemented by one or more application specific integrated circuits (ASICs), digital signal processors (DSPs), digital signal processing devices (DSPDs), programmable logic devices (PLDs), field programmable gate arrays (FPGAs), controllers, micro controller units, microprocessors, or other electronic components, and is configured to perform the methods described above.

In an example, a non-transitory computer-readable storage medium is further provided, including instructions, such as the memory 3004, executable by the processor 3020 of the apparatus 3000 to perform the methods described above. For example, the non-transitory computer-readable storage medium may be a ROM, a random access memory (RAM), a CD-ROM, a magnetic tape, a floppy disk, an optical data storage device, and the like.

Other implementations of the examples of the present disclosure will be apparent to those skilled in the art based on the specification and practice of the present disclosure disclosed. The present disclosure is intended to cover any variations, uses or adaptive changes of the examples of the present disclosure that follow the general principles of the examples of the present disclosure and include common general knowledge and conventional technical means that are within the art to which the present disclosure pertains and are not disclosed in the examples of the present disclosure. The specification and examples can be considered as examples, with a true scope and spirit of the examples of the present disclosure being indicated by the following claims.

It can be understood that the examples of the present disclosure are not limited to the precise arrangements that have been described above and shown in the drawings, and that various modifications and changes can be made without departing from the scope of the examples of the present disclosure. The scope of the examples of the present disclosure is limited by the appended claims.

The invention claimed is:

1. An information transmission method, performed by a user equipment (UE), the method comprising:

in response to a positioning requirement triggered by the UE, sending positioning capability information to a positioning server, wherein the positioning capability information is configured to indicate positioning measurement capability of the UE, wherein the positioning requirement triggered by the UE comprises at least one of:

detecting a start of a positioning-related service; or detecting a start of positioning-related communication, wherein the method further comprises:

receiving a first positioning request from the positioning server, wherein the first positioning request is configured to indicate to the UE to perform first positioning measurement, and is determined by the positioning server based on the positioning capability information, wherein the first positioning request comprises first positioning assistance information and a time parameter, the first positioning assistance information is at least configured to indicate the UE to perform configuration of the first positioning measurement, and the time parameter is configured to indicate time information for the UE to perform the first positioning measurement;

performing the first positioning measurement based on the first positioning request and the first positioning assistance information; and sending a measurement result obtained by performing the first positioning measurement to the positioning server, wherein performing the first positioning measurement based on the first positioning request and the first positioning assistance information comprises:

performing the first positioning measurement based on the time parameter, wherein the time parameter is configured to indicate at least one of:

a start moment of the first positioning measurement;

a time offset relative to a transmission time stamp of the first positioning request; or an end moment of the first positioning measurement.

2. The method according to claim 1, further comprising:

sending a second positioning request to the positioning server, wherein the second positioning request indicates the UE to perform second positioning measurement;

receiving second positioning assistance information sent by the positioning server in response to the second positioning request, wherein the second positioning assistance information is at least configured to indicate the UE to perform configuration of the second positioning measurement; and wherein the second positioning assistance information is determined by the positioning server based on the positioning capability information; and performing the second positioning measurement based on the second positioning assistance information.

3. The method according to claim 1, wherein sending the positioning capability information to the positioning server comprises:

forwarding the positioning capability information to the positioning server through a base station.

4. The method according to claim 1, wherein the positioning requirement comprises at least one of:

a positioning requirement within the UE; or access to a network by the UE.

5. A non-transitory storage medium, storing an executable program which, when executed by a processor, causes the processor to perform steps of the information transmission method according to claim 1.

6. An information transmission method, performed by a positioning server, the method comprising:

receiving positioning capability information sent by a user equipment (UE), wherein the positioning capability information is sent by the UE in response to a positioning requirement triggered by the UE, and the positioning capability information is configured to indicate positioning measurement capability of the UE, wherein the positioning requirement triggered by the UE comprises at least one of:

detecting, by the UE, a start of a positioning-related service; or detecting, by the UE, a start of positioning-related communication, wherein the method further comprises:

sending to the UE a first positioning request for indicating the UE to perform first positioning measurement, wherein the first positioning request is determined by the positioning server based on the positioning capability information, wherein the first positioning request comprises first positioning assistance information and a time parameter, the first positioning assistance information is at least configured to indicate the UE to perform configuration of the first positioning measurement, and the time parameter is configured to indicate time information for the UE to perform the first positioning measurement; and receiving a measurement result obtained by the UE by performing the first positioning measurement in response to the first positioning request, wherein receiving the measurement result obtained by the UE by performing the first positioning measurement in response to the first positioning request comprises:

receiving the measurement result obtained by the UE by performing the first positioning measurement based on the time parameter, wherein the time parameter is configured to indicate at least one of:

a start moment of the first positioning measurement;

a time offset relative to a transmission time stamp of the first positioning request; or an end moment of the first positioning measurement.

7. The method according to claim 6, further comprising:

receiving a second positioning request sent by the UE, wherein the second positioning request indicates the UE to perform second positioning measurement; and in response to the second positioning request, sending second positioning assistance information, wherein the second positioning assistance information is at least configured to indicate the UE to perform configuration of the second positioning measurement; and wherein the second positioning assistance information is determined by the positioning server based on the positioning capability information.

8. The method according to claim 6, wherein receiving the positioning capability information sent by the UE comprises:

receiving the positioning capability information forwarded through a base station.

9. The method according to claim 6, wherein the positioning requirement comprises at least one of:

a positioning requirement within the UE; or access to a network by the UE.

10. A communication device, comprising a processor, a memory, and an executable program stored on the memory and executable by the processor, wherein the executable program, when executed by the processor, causes the processor to perform steps of the information transmission method according to claim 6.

11. A non-transitory storage medium, storing an executable program which, when executed by a processor, causes the processor to perform steps of the information transmission method according to claim 6.

12. A user equipment (UE), comprising a processor, a memory, and an executable program stored on the memory and executable by the processor, wherein the executable program, when executed by the processor, causes the processor to:

in response to a positioning requirement triggered by the UE, send positioning capability information to a positioning server, wherein the positioning capability information is configured to indicate positioning measurement capability of the UE, wherein the positioning requirement triggered by the UE comprises at least one of:

detecting a start of a positioning-related service; or detecting a start of positioning-related communication, wherein the processor is further configured to:

receive a first positioning request from the positioning server, wherein the first positioning request is configured to indicate to the UE to perform first positioning measurement, and is determined by the positioning server based on the positioning capability information, wherein the first positioning request comprises first positioning assistance information and a time parameter, the first positioning assistance information is at least configured to indicate the UE to perform configuration of the first positioning measurement, and the time parameter is configured to indicate time information for the UE to perform the first positioning measurement;

perform the first positioning measurement based on the first positioning request and the first positioning assistance information; and send a measurement result obtained by performing the first positioning measurement to the positioning server, wherein the processor is further configured to:

perform the first positioning measurement based on the time parameter, wherein the time parameter is configured to indicate at least one of:

a start moment of the first positioning measurement;

a time offset relative to a transmission time stamp of the first positioning request; or an end moment of the first positioning measurement.

13. The UE according to claim 12, wherein the processor is further configured to:

send a second positioning request to the positioning server, wherein the second positioning request indicates the UE to perform second positioning measurement;

receive second positioning assistance information sent by the positioning server in response to the second positioning request, wherein the second positioning assistance information is at least configured to indicate the UE to perform configuration of the second positioning measurement; and wherein the second positioning assistance information is determined by the positioning server based on the positioning capability information; and perform the second positioning measurement based on the second positioning assistance information.

* * * * *